United States Patent
Johnson et al.

[11] Patent Number: 5,846,045
[45] Date of Patent: Dec. 8, 1998

[54] OVER-THE-CAB LOADER AND CARRIER

[76] Inventors: Tim Johnson, 7296 Everson Goshen Rd.; Ron Johnson, 7248 Everson Goshen Rd., both of Everson, Wash. 98247; Robert Ellis, 609 E. Kelly Rd., Bellingham, Wash. 98226

[21] Appl. No.: 929,384

[22] Filed: Sep. 15, 1997

[51] Int. Cl.$^6$ .................................................. B60R 9/00
[52] U.S. Cl. ...................................... 414/462; 280/414.1
[58] Field of Search ................................. 414/462, 498; 224/402, 405, 488, 492, 502, 504, 506, 510, 310; 280/414.1

[56] References Cited

U.S. PATENT DOCUMENTS

| | | | |
|---|---|---|---|
| 2,537,587 | 1/1951 | Humphrey | 224/494 |
| 2,573,187 | 10/1951 | Desilets | 224/510 |
| 2,715,974 | 8/1955 | Van Nest | 414/462 |
| 2,931,528 | 4/1960 | Mabry . | |
| 3,170,583 | 2/1965 | Meyer . | |
| 3,531,006 | 9/1970 | Farchmin | 414/462 |
| 3,902,612 | 9/1975 | Hall . | |
| 4,806,060 | 2/1989 | Molski | 414/462 |
| 4,953,757 | 9/1990 | Stevens et al. . | |
| 5,071,308 | 12/1991 | Tibbet . | |
| 5,511,928 | 4/1996 | Ellis | 414/462 |

*Primary Examiner*—Karen M. Young
*Assistant Examiner*—Gregory A. Morse
*Attorney, Agent, or Firm*—Jensen & Puntigam, P.S.

[57] ABSTRACT

An over-the-cab transporting device, including a pair of tracks extending from a position adjacent the vehicle-supporting surface over the cab to a position aft of the cab. A load-carrying platform moves from a position partly supported by the vehicle-supporting surface for loading and unloading to a position above the cab, where it is secured for transport.

3 Claims, 6 Drawing Sheets

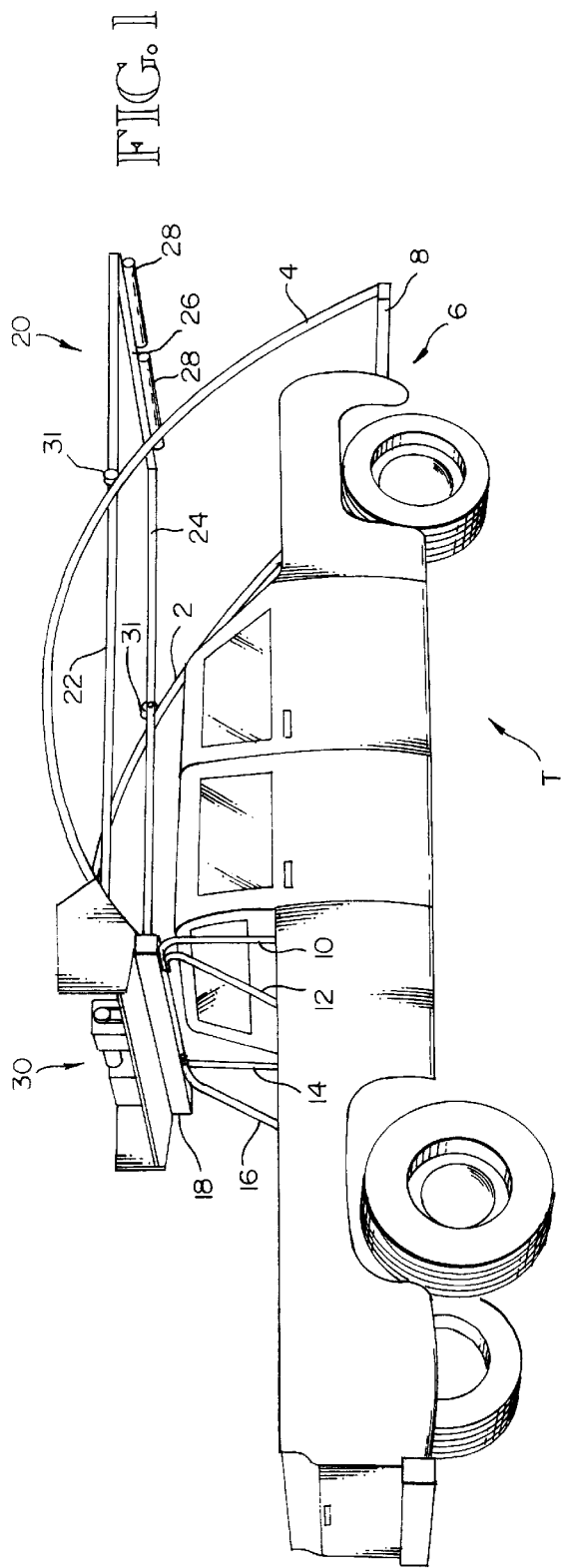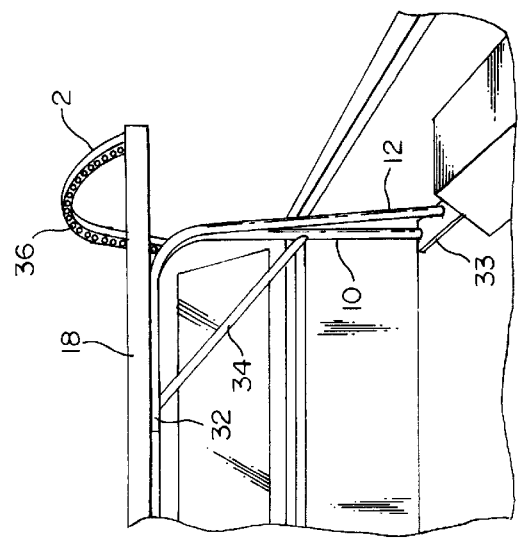

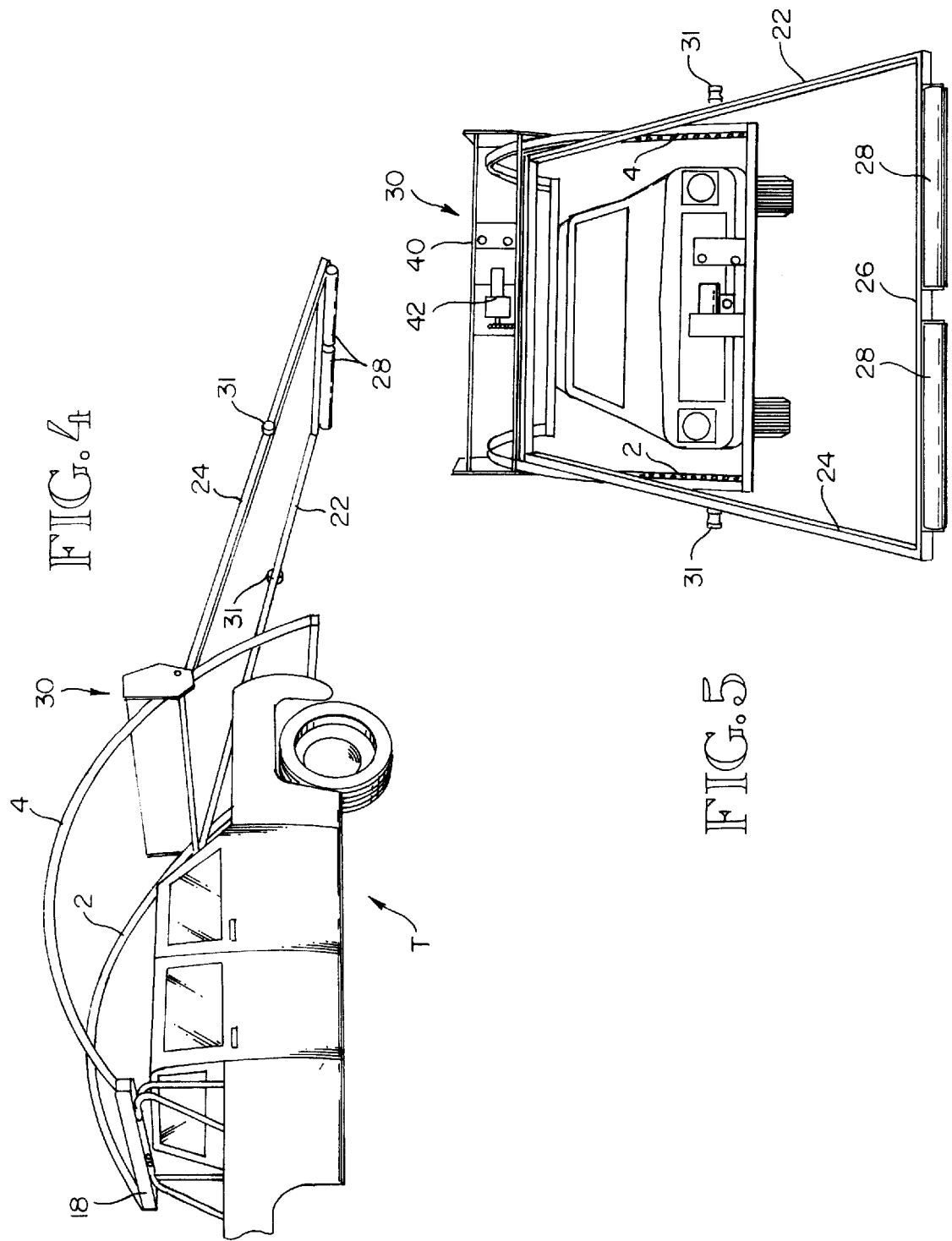

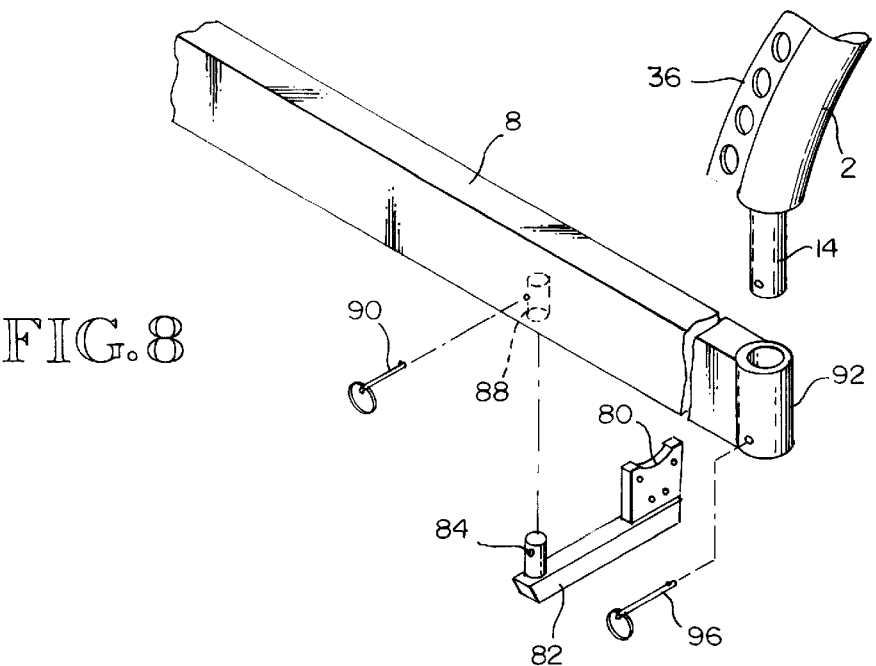
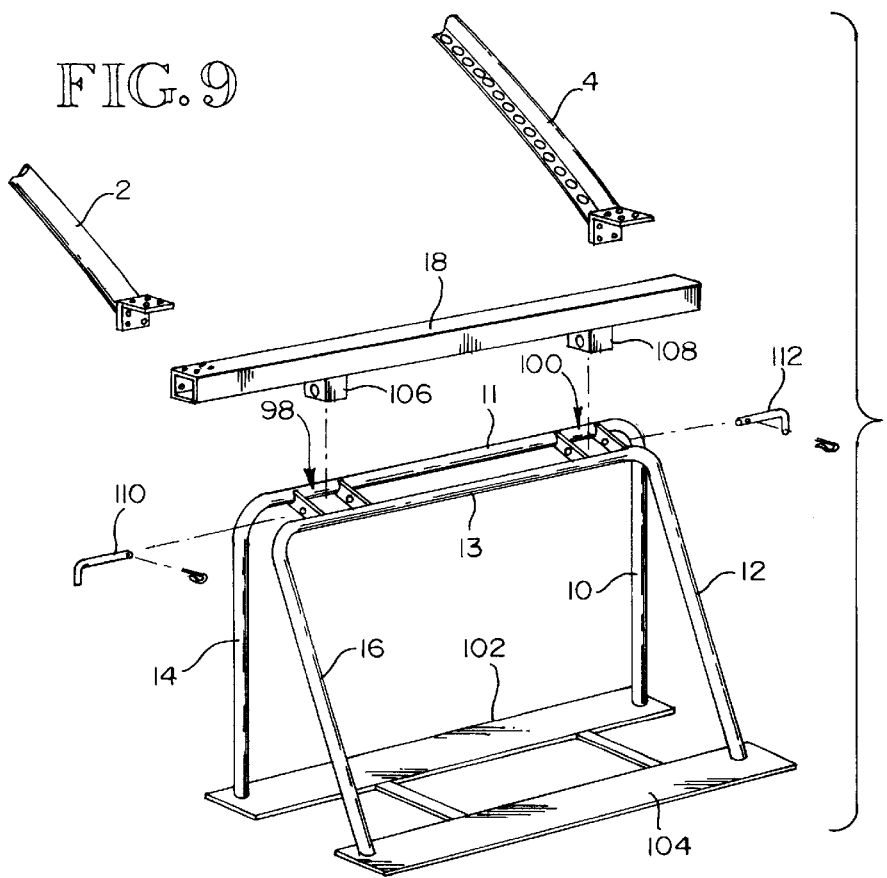

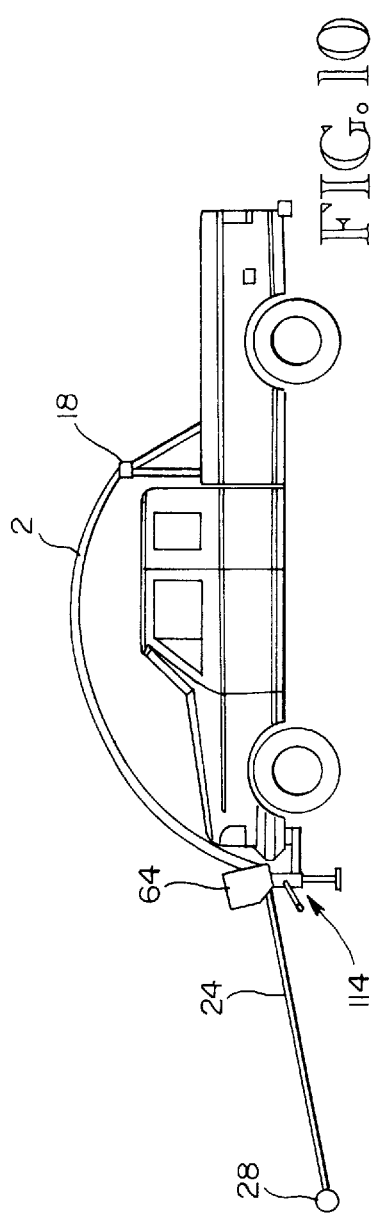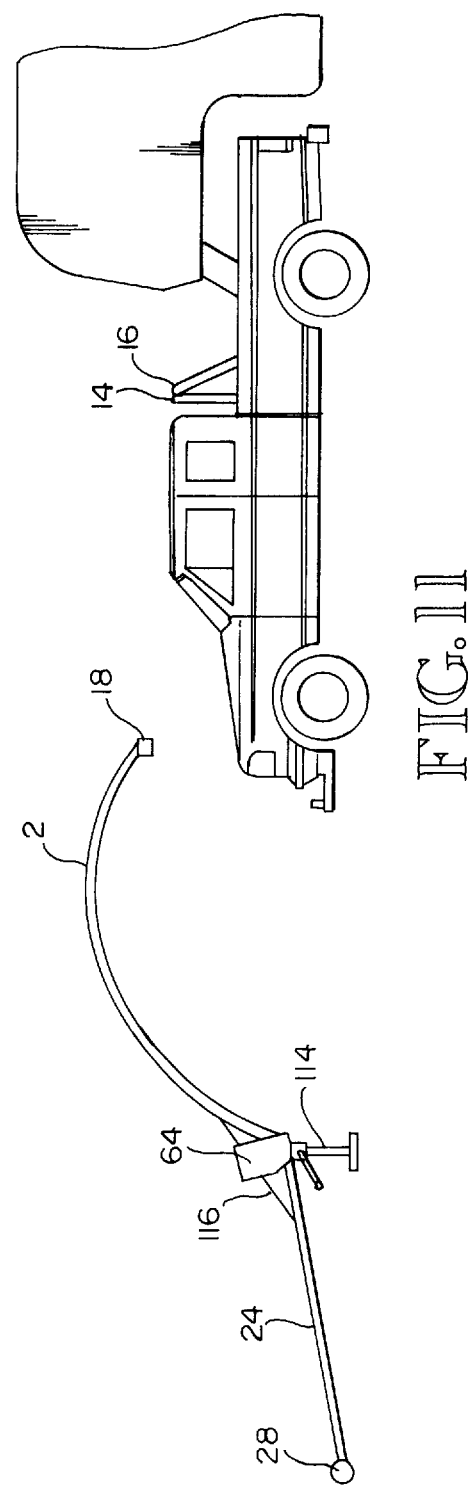

OVER-THE-CAB LOADER AND CARRIER

TECHNICAL FIELD

This invention relates to a device which enables the loading and carrying of objects over the cab of a motorized vehicle, and in particular, includes a pair of arcuate tracks or rails extending from the lower front portion of a vehicle to a rear portion of the vehicle. A motorized platform or rack, which moves from the position at the front of the vehicle for loading and unloading to a position above the cab for traveling and/or storage, is driven along the rails.

BACKGROUND OF THE INVENTION

It is well known to carry objects such as small boats, skis and other material on top of a motor vehicle, but it is inherently difficult to load and unload objects of any size or weight to or from a position as awkward as the top of a vehicle.

Prior art known to the inventors includes U.S. Pat. No. 2,931,528 granted to Mabry, Apr. 5, 1960, which discloses a vehicle-mounted carrying system which has a cargo box mounted to rails secured to an automobile. The cargo box can be winched from a load-unload to a stowed position on the trunk.

U.S. Pat. No. 3,170,583 granted to Meyer, Feb. 23, 1965 discloses a boat transport mechanism to be mounted on the top of a motor vehicle, wherein a boat-carrying rack device is winched from a storage-carrying position on top of the vehicle to a load-unload position in contact with a supporting surface. The device pivots around a point on the bumper.

U.S. Pat. No. 3,902,612 granted to Hall, Sep. 2, 1965 discloses a reel transport mechanism, including a pivoting arm for loading and unloading the reel of material and placing it on a vehicle-supported rack, wherein it is transported and stored.

U.S. Pat. No. 4,953,757 granted to Stevens et al, Sep. 4, 1990 discloses a front rack for a truck, wherein a portion of the rack tips downwardly for loading and unloading and can then be cranked upwardly to a position above the cab of the truck for transport.

U.S. Pat. No. 5,071,308 granted to Tibbet, Dec. 10, 1991 discloses a devices for carrying a boat above the cab of a pickup truck, wherein the front support is pivotable about the bumper and when it pivots transports a telescopic structural member downwardly to the support surface for loading and unloading the boat and is then reversibly pivoted for storage and carrying.

U.S. Pat. No. 5,511,928 granted to Ellis, Apr. 30, 1996 discloses a load transporting device for use above a motorized vehicle, wherein the load is carried upon a rack or platform which is moved from an extended load-unload position in contact with the ground support to a storage transport position above the vehicle.

DISCLOSURE OF THE INVENTION

With the above-noted prior art in mind, it is an object of the present invention to provide a means for transporting cargo over the top of a motor vehicle, wherein said transportation means can be moved from a storage/transportation position above the vehicle to a load-unload position adjacent the supporting surface.

It is another object of the present invention to provide a transport means for use in conjunction with a pickup truck or the like, wherein a boat or other recreational vehicle may be carried over the cab of the truck, leaving the bed of the truck for use for other purposes including a fifth-wheel attachment.

Still a further object of the present invention is to provide a unique means for carrying cargo over the passenger area of a motor vehicle and includes a load-carrying platform which is guided from a load-carrying position to a load and unload position guided by a pair of arcuate members secured to the vehicle in front of the passenger pod and again behind the passenger pod.

Yet another object of the present invention is to provide a device for carrying a load above the cab of a pickup truck, wherein said device is quickly and easily removed.

Still a further object of the present invention is to provide a unique driving mechanism for moving a load-bearing platform from a position adjacent the ground to a position above a passenger vehicle.

BRIEF DESCRIPTION OF THE DRAWINGS

FIG. 1 discloses a motor vehicle having the inventive carrying device in the position for storage and transport, the actual load carrying platform being removed for clarity.

FIG. 2 shows a method of securement of the rear end of the invention to the bed of a pickup truck.

FIG. 4 is yet another view of the platform partially extended.

FIG. 5 is a front end view of the platform partially extended.

FIG. 8 is an exploded view depicting the attachment of the inventive device to the front of the vehicle.

FIG. 9 is an exploded view showing the securement of the inventive device behind the cab of the vehicle.

FIG. 10 depicts the inventive device in the process of removal or attachment.

FIG. 11 shows the inventive device removed from the vehicle.

BEST MODE FOR CARRYING OUT THE INVENTION

Figure 3:
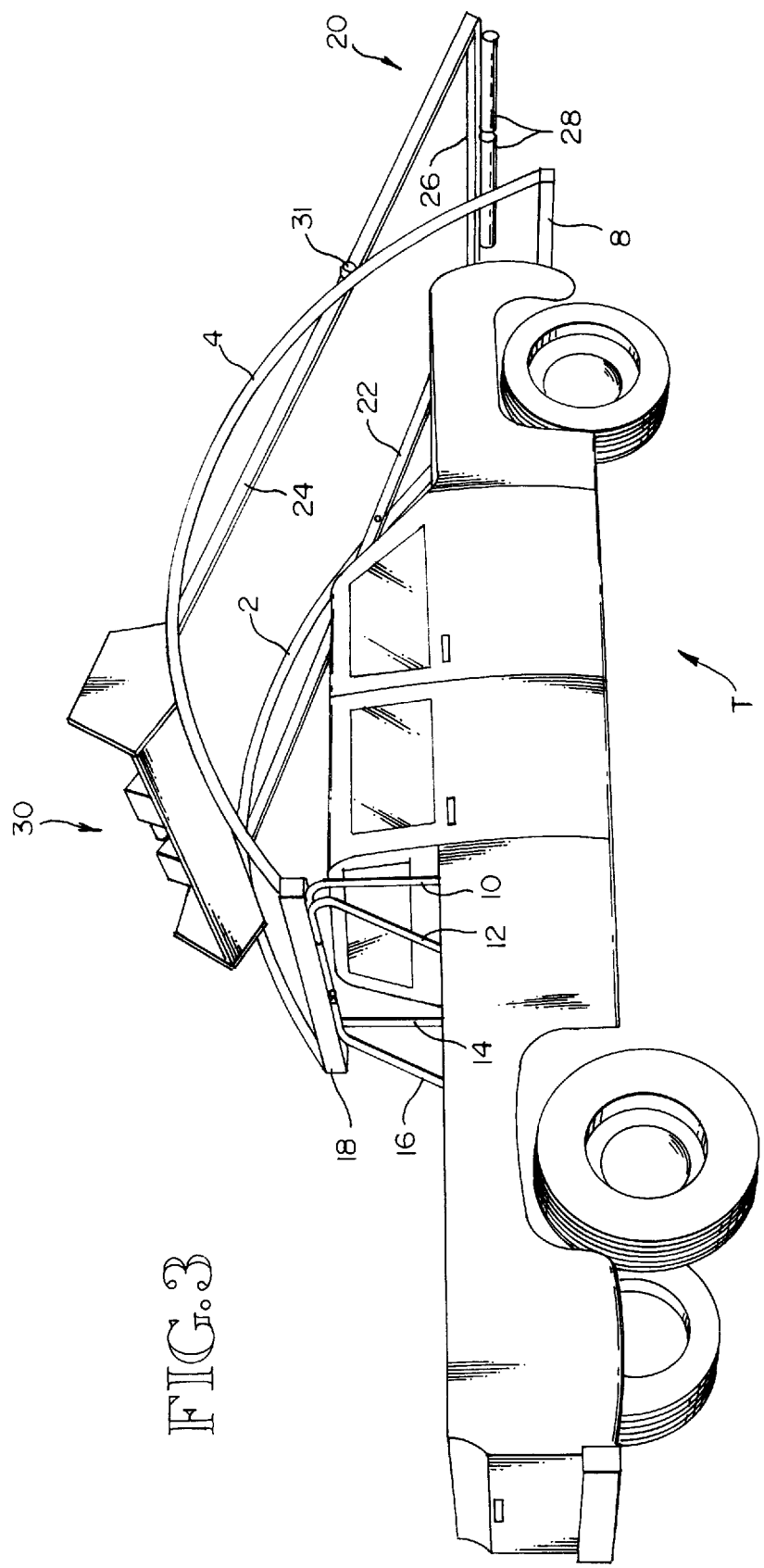
FIG. 3 depicts the inventive device having the platform partially extended.

As seen in FIG. 1, the present invention is mounted to a pickup truck, but could as easily be mounted to another type of motor vehicle. In FIG. 1, the present invention is secured to a pickup truck T and comprises a pair of arcuate tubular members 2, 4 which lie in parallel planes and are secured to the front of the vehicle as at 6, including a structural horizontal member 8 which extends between the ends of the arcs 2, 4. The rear of the arcuate members 2, 4 are supported in the bed of the truck T by means to be explained hereinafter, but as seen in this view are uprights 10, 12, 14, 16 topped by a crossbar 18. Further seen in this view is a rectangular load-supporting framework 20 having parallel side members 22, 24, exterior end member 26 including rollers 28, and at the rearward end of the frame is the driving mechanism generally designated as 30.

Reference is now had to FIG. 2, wherein the rear end of the inventive track system can be seen. As seen in this view, track 2 is secured to crosspiece 18, which in turn is supported by uprights 10 and 12, which are bent into horizontal portion 32, braced by angular brace 34, and secured to crosspiece 18. Also to be seen in this view is a plurality of sequential holes in a flange 36 secured to arcuate member 2, for reasons to be disclosed hereinafter.

Referring now to FIG. 3, the inventive load-unload carrying apparatus can be seen on the truck T, and identical numerals to those utilized in FIGS. 1 and 2 are used for identification. It is to be understood that the apparatus as seen in this view is located between the load and unload positions and that a pair of wheels 31 are in contact with arcuate members 2, 4 guiding the apparatus over the front of the vehicle.

FIG. 4 illustrates the device in the position whereat the rollers 28 have contacted the ground; and as the rear end of the apparatus 30 descends on the arcs 2, 4, it causes the wheel 31 to leave the arcs 2, 4; and as 30 descends to the lower end of arcs 2, 4, the apparatus continues to become more horizontal and parallel with the supporting terrain.

FIG. 5 is a front end view of the apparatus when it is in a position between the showing of FIGS. 3 and the showing of FIG. 4. FIG. 5 discloses the driving apparatus which includes a battery 40 and an electric motor 42 connected to the driving mechanism, as best seen in FIG. 6.

Figure 6:
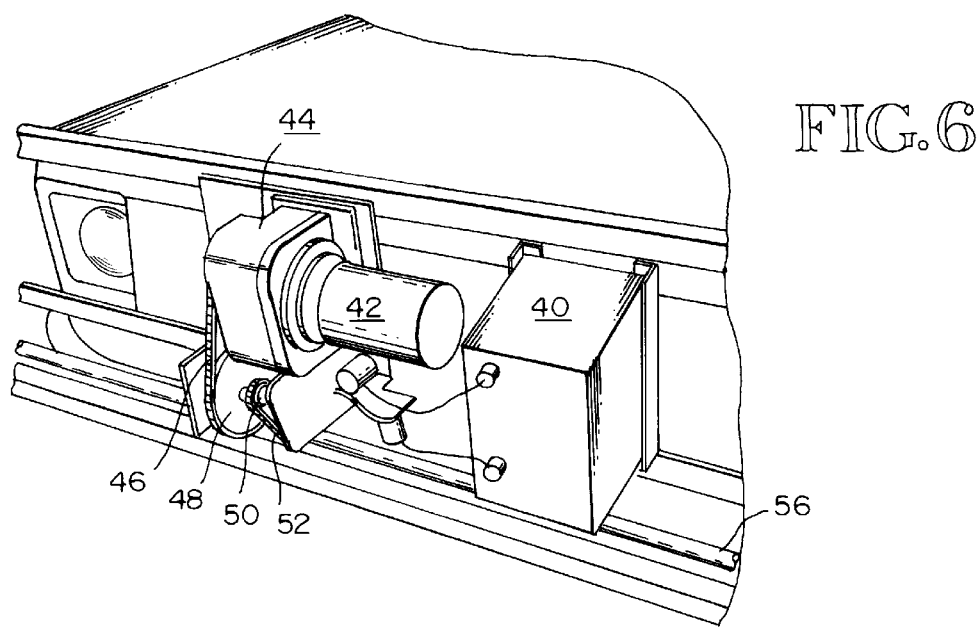
FIG. 6 is a front end view disclosing the drive mechanism.

As seen in FIG. 6, the battery 40 is connected to the electric motor 42 which drives through a transmission 44, through a chain 46, through a sprocket 48 which is rigidly connected to a smaller sprocket 50, driving chain 52 which, although not shown, is driving a sprocket mounted upon shaft member 56, which extends the width of the vehicle and drives the apparatus up and down the arcs 2 and 4.

Figure 7:
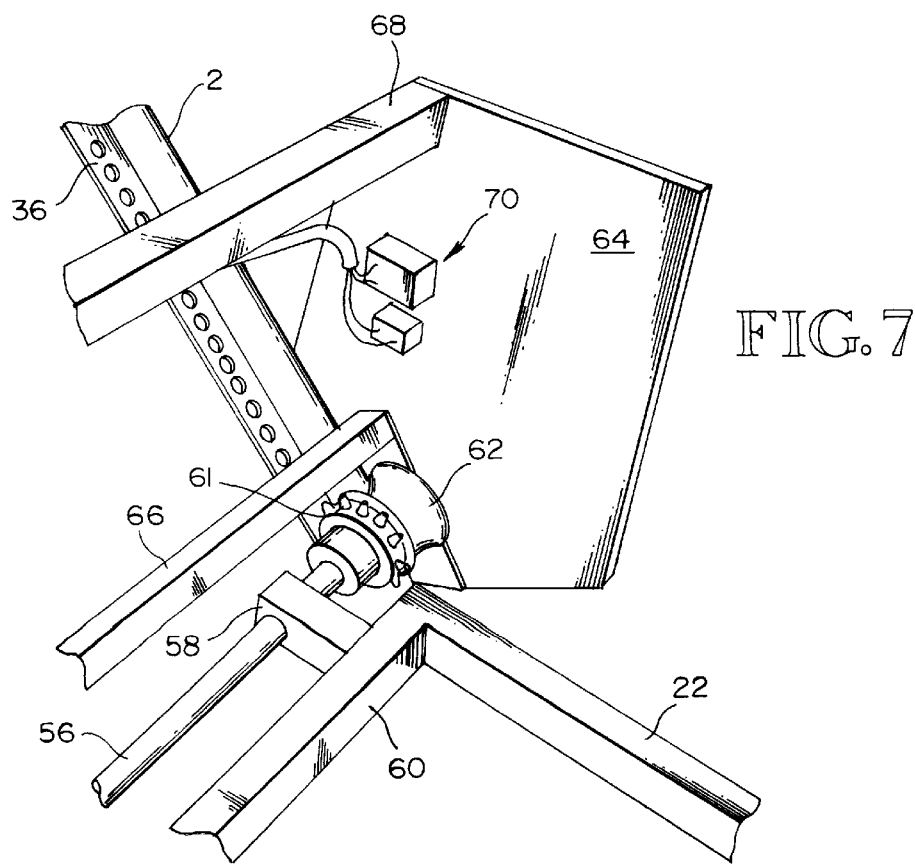
FIG. 7 is a view disclosing the interaction of the drive mechanism with the support mechanism

Reference is now had to FIG. 7, wherein the shaft 56 (only one end shown) is journaled through a member 58 secured to the front end frame 60 of the load platform. At the end of shaft 56 is a wheel 61 having a plurality of conical protrusions which mesh with the holes in the member 36 for driving the apparatus from a load to unload position as it rotates. Likewise seen in this view, adjacent and secured to wheel 60 and shaft 56 is a second wheel 62 having an arcuate exterior surface to engage the tubular arcuate members 2 and 4 helping to retain the device on track.

A rigid shielding plate 64 secured to the loading platform protects and shields the moving mechanism and is rigidly secured to crossmembers 66 and 68, forming a rigid front end for the load-bearing platform and also serves as a location for placing electrical elements 70 which are responsive to a remote switch for controlling the upward and downward movement of the inventive platform.

Referring now to FIGS. 8 and 9, the preferred method of securing the inventive device to a vehicle is shown. It is to be noted that the attachment method allows for easy removal of the device.

As seen in FIG. 8, the front end of the device is secured to the frame of the vehicle by bolting mounting plate 80 to the frame of the vehicle. Rigidly secured to the bottom of mounting plate 80 is a pair of forwardly projecting extension bars 82 having secured there to upwardly projecting pins 84. A solid bar 8 extends the full width of the vehicle and includes bores 88 to accept pins 84. The bar 8 is locked in place by keeper keys 90. At the outer ends of bar 8 are a pair of sockets 92 to receive a solid extension 94 of arcuate tubes 2. Although shown in this view as being secured by keeper pin 96, it is contemplated that for final installation the securement between 92 and 94 would be permanent.

Referring now to FIG. 9, it can be seen that the rear support element for the inventive device is comprised of legs 10 and 14, which are vertical just behind the cab, joined by integral crosspiece 11 and angled leg members 12, 16 are joined by integral crossmember 13. Elements 11 and 13 are joined by horizontal joining elements 98 and 100, which are spaced for reasons to be explained hereinafter. Leg elements 10, 12, 14 and 16 are supported by plate members 102 and 104, which are secured to the bed of the truck. It is to be understood that the structure shown in FIG. 9 is a different and alternate structure to the support as shown in FIG. 2.

Attached to the underside of crossbeam 18 are a pair of downwardly projecting blocks 106, 108 which, respectively, fit between the pair of crossmembers 98 and 100 and are secured in place by means of pins 110, 112. As can be seen, the arcuate members 2, 4 are secured to the crossmember 18 and act as a unit which is easily removed from the supporting structure.

As can be seen, since the unit now consists principally of crossmembers 18 and 8 in conjunction with the arcuate members 2 and 4, the entire device may be lifted off of the vehicle. The removal of the device from the vehicle is illustrated in FIGS. 10 and 11. First, a pair of jacks 114 is placed beneath the crossmember 18, when the load-carrying device is in its extended position with the rollers 28 on the ground, lifting the forward crossbar 8 out of its supporting bracket and simultaneously lifting the rear crossmember 18 from its supporting bracket, allowing the vehicle to back away from the unit, as illustrated in FIG. 11. Likewise seen in FIG. 11 is a stabilizing cable 116 extending between the arcuate member 2 and the framework 24 to rigidify the entire structure when not on the vehicle.

Thus, as can be seen, the present invention provides a unique apparatus for loading, unloading and transporting vehicles, such as boats or other recreational vehicles, wherein the devices are stored and carried above the passenger compartment, leaving the bed of the truck open for other uses. It is to be understood that although the drive mechanism is specifically shown and felt to be the best mode, it certainly is comprehensible that the apparatus could be driven by a cable and winch connection or some other standard, well known drive.

We claim:

1. A vehicle-supported device for lifting and storing a load, movable from a stored position to an extended load/unload position, comprising:

a pair of spaced, substantially parallel, arcuate members extending from a position at one end of the vehicle whereat they terminate slightly above the vehicle-supporting surface to a position intermediate the two ends of the vehicle;

a load-carrying device including a rectangular frame member defining a flat carrying element of a width slightly less than the space between the arcs;

two pair of guide elements interacting with the arcuate members to support the load-carrying device during storage and to guide the load-carrying device during movement from the stored position to and from the load/unload position; and means interactive with the arcuate members to move the load-carrying device from the stored position to and from the load/unload position.

2. A vehicle-carried cargo loading and unloading and transporting device, comprising:

a pair of substantially identical arcuate track members, each rigidly secured within substantially parallel planes to the front and back of the vehicle, extending above the vehicle body along each side thereof;

carrier means including a rectangular frame extending between the track means and including roller means spaced along the outer edge thereof to interact with the track members to guide the carrier means from a first position adjacent the vehicle's supporting surface for loading and unloading to a second position for storing and transporting the cargo; and means for moving the carrier means between the first and second positions.

3. A cargo loader as in claim 2, wherein the loading device comprises a pair of driven sprocket members interacting with a plurality of serration bores associated with the track members.

\* \* \* \* \*